Jan. 31, 1939.   C. R. ALDEN   2,145,640
FLUID DISTRIBUTION SYSTEM
Filed May 11, 1932   6 Sheets-Sheet 3
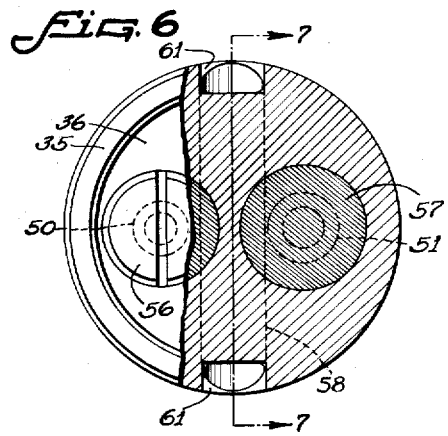
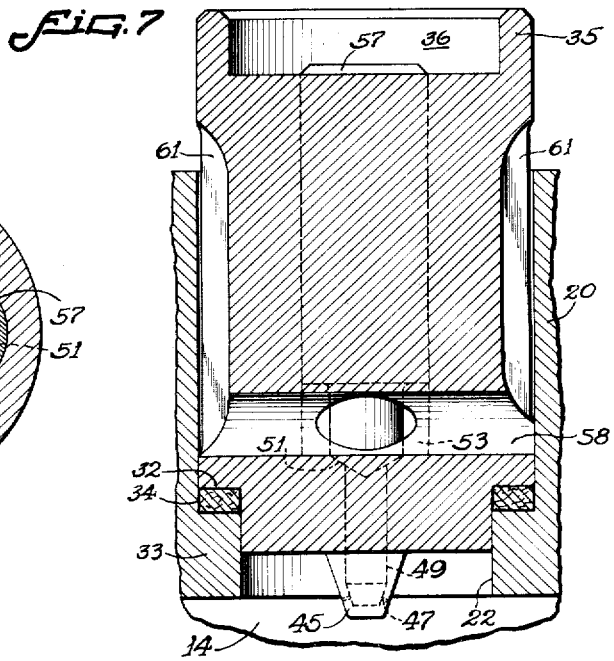
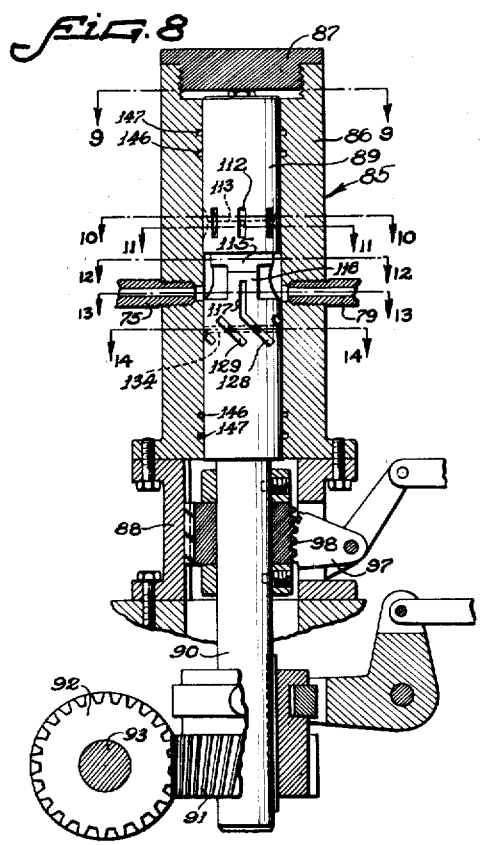
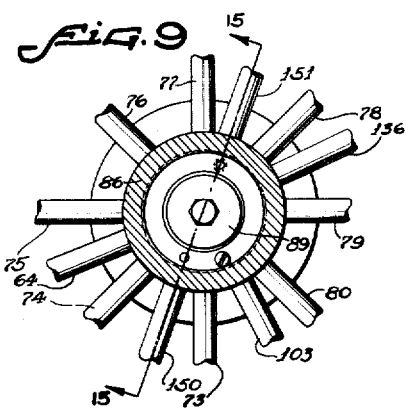
Inventor
Carroll R. Alden
By Chindahl, Parker & Carlson
Attorneys

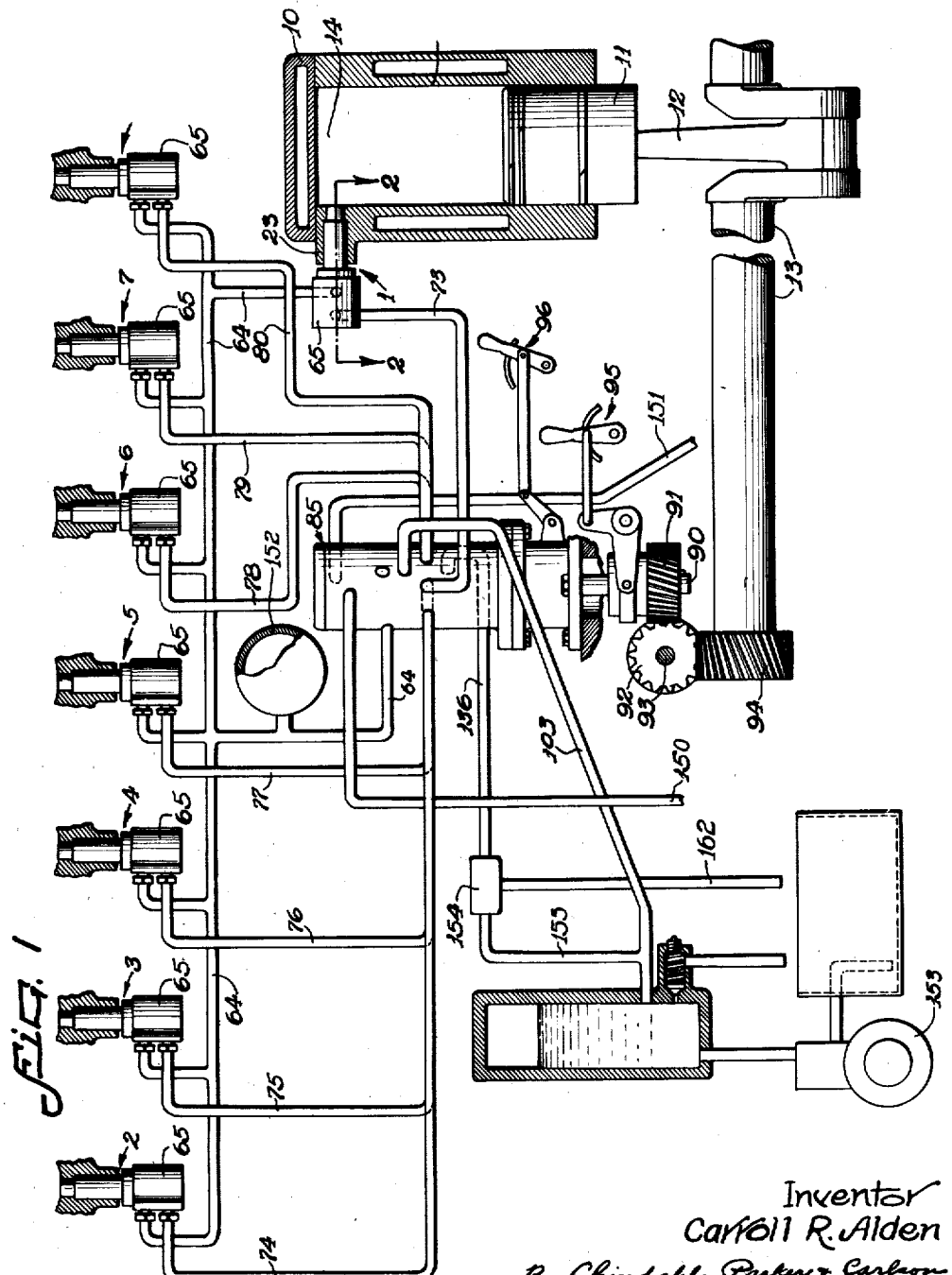

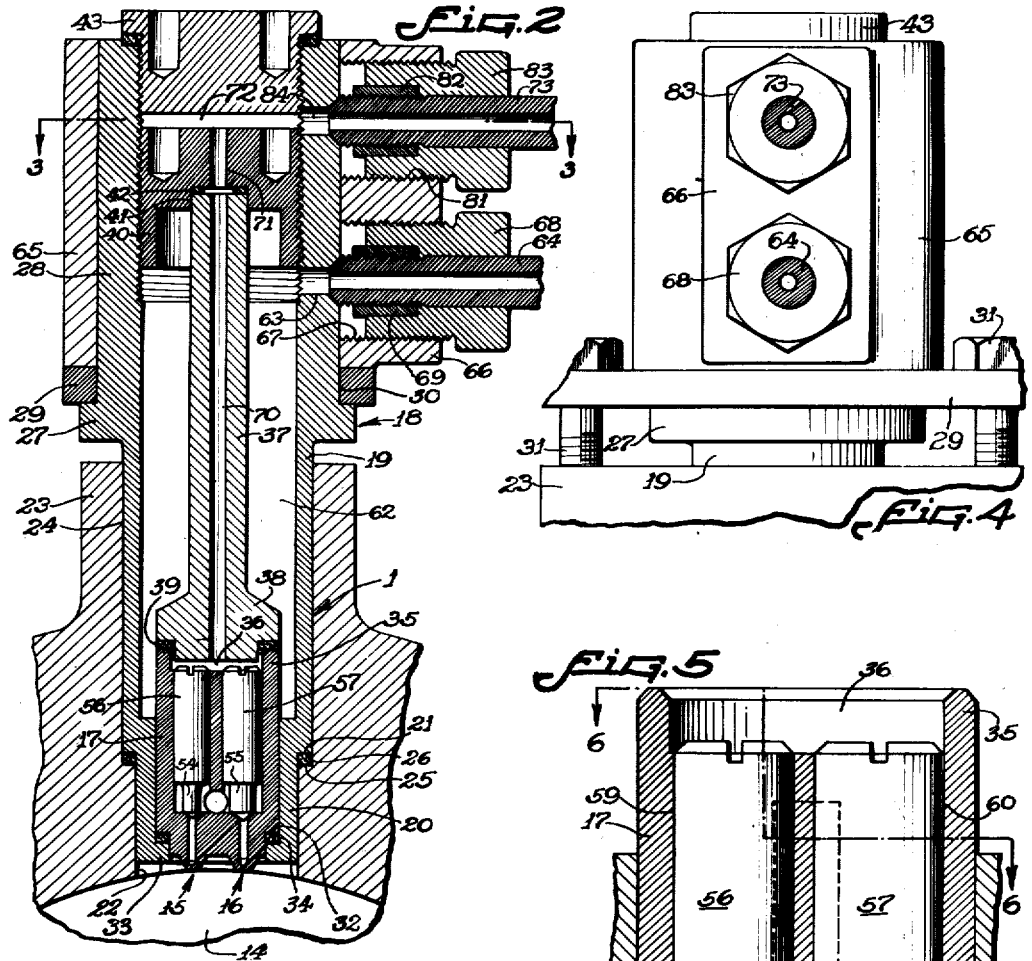

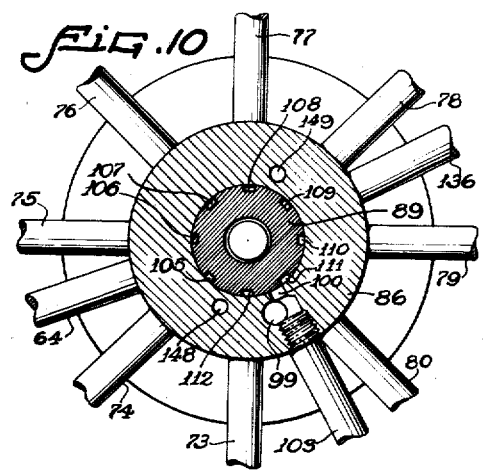
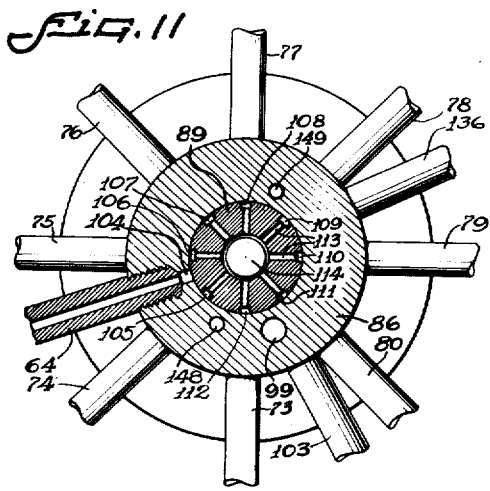
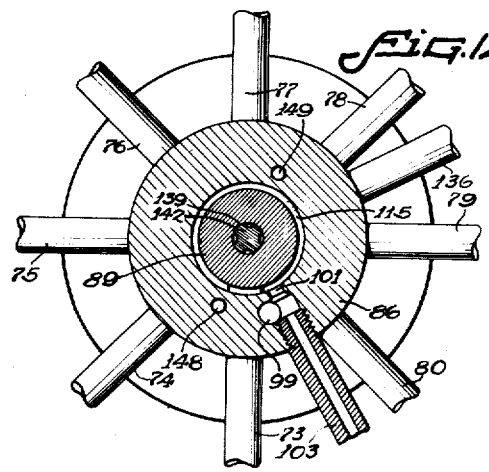
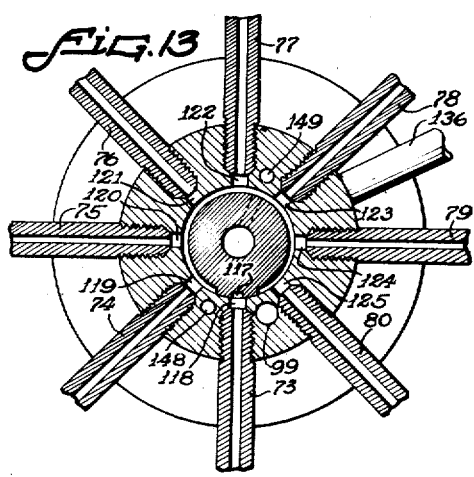
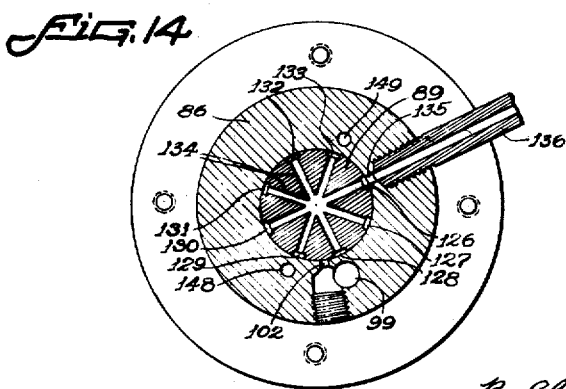

Jan. 31, 1939.  C. R. ALDEN  2,145,640
FLUID DISTRIBUTION SYSTEM
Filed May 11, 1932  6 Sheets—Sheet 5
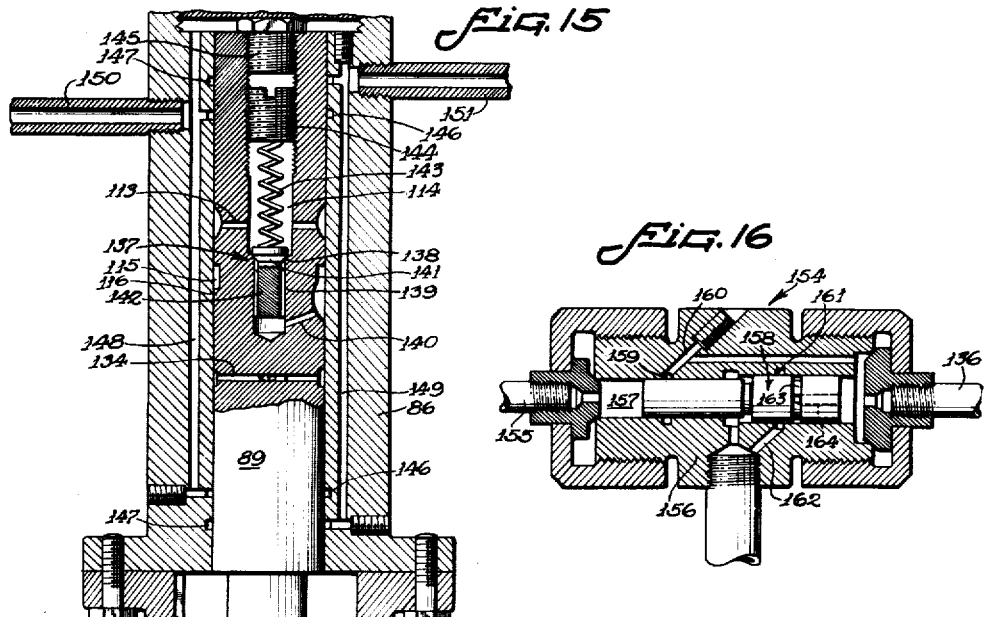
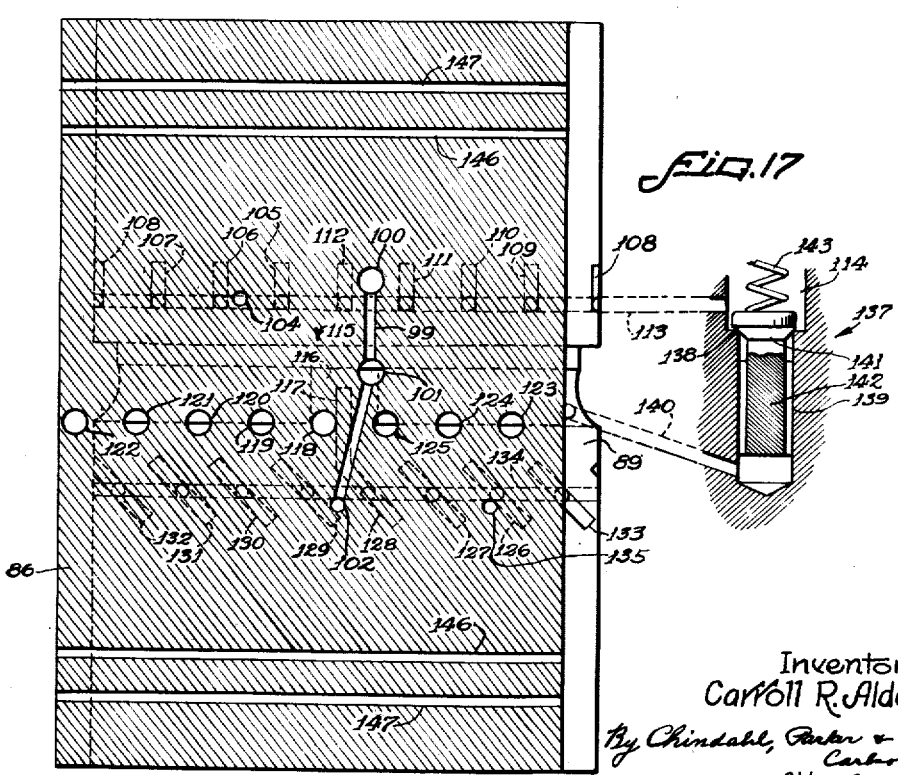
Inventor
Carroll R. Alden
By Chindahl, Parker &
Carlson
Attorneys Jan. 31, 1939.　　　C. R. ALDEN　　　2,145,640
FLUID DISTRIBUTION SYSTEM
Filed May 11, 1932　　　6 Sheets-Sheet 6

Inventor
Carroll R. Alden
By Chindahl, Parker & Carlson
Attorneys

Patented Jan. 31, 1939

2,145,640

UNITED STATES PATENT OFFICE 2,145,640

FLUID DISTRIBUTION SYSTEM

Carroll R. Alden, Detroit, Mich., assignor to Ex-Cell-O Corporation, a corporation of Michigan Application May 11, 1932, Serial No. 610,612

3 Claims. (Cl. 123—136)

The present invention relates generally to fluid distribution systems, and more particularly to improvements in fuel admission or injection systems for internal combustion engines.

One of the objects of the present invention is to provide a novel fuel injection system having a fuel injection nozzle, a fuel feed conduit connected to the nozzle, a direct source of fuel under a relatively high pressure, a secondary source branching from said direct source and including pressure reducing means for maintaining a relatively low pressure, and means selectively adjustable into position to connect either of the sources periodically to the conduit.

Another object of the invention is to provide a new and improved fuel injection system having a plurality of nozzles and means for supplying fuel under pressure to the nozzles for discharge therefrom, including means for limiting the maximum amount of fuel that can be injected in any one period of injection.

A more specific object is to provide a novel fuel injection system having a plurality of injection nozzles, a single fuel feed conduit connected in common to the nozzles and including a pressure-storage charge-limiting reservoir, a plurality of control conduits connected respectively to the nozzles, and means for periodically charging the feed conduit for successively effecting pressure fluctuations in the control conduits to effect sequential operation of the nozzles so as to release fuel from the feed conduit.

Further objects and advantages will become apparent as the description proceeds.

In the accompanying drawings, Figure 1 is a diagrammatic representation of a fluid injection system embodying the features of my invention, the nozzles for each cylinder being shown as constructed in a single unit.

Fig. 2 is an enlarged sectional view taken along line 2—2 of Fig. 1 of the multiple nozzle unit and holder.

Fig. 3 is a transverse sectional view taken along line 3—3 of Fig. 2.

Fig. 4 is a fragmentary side view of the holder taken along line 4—4 of Fig. 3.

Fig. 5 is an axial sectional view on an enlarged scale of the multiple nozzle unit.

Fig. 6 is a view of the unit with the plungers removed and taken along broken line 6—6 of Fig. 5.

Fig. 7 is an axial sectional view taken along line 7—7 of Fig. 6.

Fig. 8 is an enlarged axial sectional view of the distributor.

Figs. 9 to 14 are transverse sectional views of the distributor taken respectively along lines 9—9 to 14—14 of Fig. 8.

Fig. 15 is an axial sectional view of the distributor taken along line 15—15 of Fig. 9.

Fig. 16 is a detail sectional view on an enlarged scale of the pressure subdivider valve.

Fig. 17 is a fragmentary diagrammatic view of the distributor showing a development of the distributor casing in cross-hatched outline superimposed on a development of the rotor in dotted outline, with the rotor adjusted axially for full open throttle operation.

Figure 18:
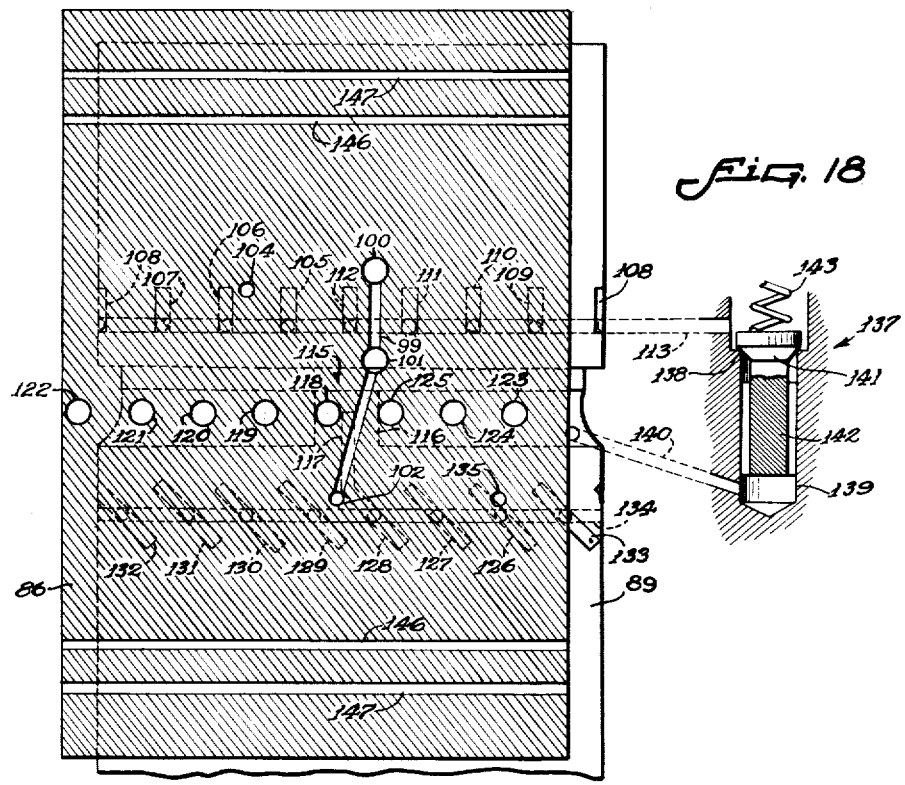
Fig. 18 is a view similar to Fig. 17 but with the rotor adjusted axially for idling throttle operation.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The engine

Referring more particularly to the drawings, the present system of fluid distribution, although adapted for various uses and particularly various types of internal combustion engines, is herein disclosed for purposes of illustration as a liquid fuel injection system applied to a Diesel engine having eight cylinders of which only one is shown. Each engine cylinder comprises a cylinder body 9 closed at the outer end by a cylinder head 10, and provided with suitable air inlet and exhaust valves (not shown). A piston 11 is slidably disposed in the cylinder body 9, and is connected through a rod 12 to a crank shaft 13. The piston 11 is so related to the cylinder body 9 that at the end of the compression stroke, a high degree of compression will be obtained in the initially small combustion space 14 underlying the cylinder head 10.

The injection means

Fuel is injected into the cylinders in timed sequence, and in each instance over a predetermined period of the high compression stage. A plurality of injection nozzles are provided for each cylinder, the multiple nozzle groups for the respective cylinders being identified generally by the reference characters 1 to 8 inclusive. Preferably, the nozzle groups are alike in construction and arrangement, and hence a detailed description of group 1 for the cylinder 9 will suffice for all.

The multiple nozzle group 1 may comprise any desired number of injection nozzles, two nozzles, namely a primary nozzle 15 and a secondary nozzle 16, being shown in the present instance. These nozzles 15 and 16 may be mounted in any suitable position to discharge into the combustion space 14, and may be arranged separately, but preferably they are combined in a unitary structure as shown in Figs. 5 and 6. The provision of a plurality of injection nozzles affords a choice in the arrangement of the nozzles and design of the combustion chamber such that a uniform and thorough penetration of the combustion space 14 can be obtained without relying largely on turbulence. In the present instance, the nozzle unit 1 is mounted in the side of the cylinder 9, as shown in Figs. 1 and 2, to inject a plurality of jets of fuel laterally into the combustion space 14. With a plurality of jets of fuel, quick, thorough and uniform penetration by the fuel of the combustion space 14 and fine atomization of the fuel are possible.

The injection nozzles 15 and 16 of group 1 may be provided in various forms. In the present instance, the unitary structure, of which the two nozzles form part, comprises a cylindrical body 17 which is adapted to be removably mounted in a holder 18 (Figs. 2 to 4).

In the preferred form, the holder 18 comprises an elongated casing 19, preferably cylindrical in shape, which has a sleeve 20 of reduced diameter on its inner end, and which presents an annular peripheral seating shoulder 21 at the juncture with the sleeve. The sleeve 20 is snugly disposed in the inner end of a bore 22 opening through a boss 23 on the side of the cylinder 9 into the combustion space 14. The outer portion of the bore 22 is enlarged as indicated at 24 to snugly receive the casing 19 and to provide an outwardly facing annular seat 25 adapted for engagement by the shoulder 21. A gasket washer 26 may be disposed between the shoulder 21 and the seat 25.

To secure the holder removably in position, the outer portion of the casing 19 is formed with a peripheral flange 27, and is enlarged beyond the flange as indicated at 28. A clamping plate 29, apertured at 30 to receive the outer end 28 of the casing, engages the outer face of the flange 27, and is securely clamped by means of bolts 31 threaded into the end of the boss 23.

The body 17 of the nozzle unit 1 is mounted in the sleeve 20, and is formed adjacent its inner end with an annular peripheral seating shoulder 32 in engagement with an inner peripheral flange 33 on the inner end of the sleeve. A gasket washer 34 may be disposed between the shoulder 32 and the flange 33. The outer end of the body 17 projects from the sleeve 20 into the intermediate section of the casing 19 in concentrically spaced relation thereto, and is formed with a peripheral end flange 35 defining a central recess or chamber 36.

The body 17 is held removably in position by means of a clamping rod 37 extending axially in the casing 19, and having a head 38 on its inner end engaging the end of the flange 35. A gasket washer 39 is positioned between the flange 35 and the head 38. A clamp nut 40 is adjustably threaded into the outer end 28 of the casing 19 and has a centering recess 41 engaging the outer end of the rod 37 to secure the head 38 tightly against the body 17. A gasket washer 42 is disposed between the rod 37 and the bottom of the recess 41. The extreme outer end of the casing 19 is tightly closed by a screw plug 43. It will be evident that bodies 17 with different numbers of nozzles may be mounted interchangeably in the holder 18.

The nozzles 15 and 16 (Figs. 5 to 7) respectively comprise two discharge tips 44 and 45 formed on the inner end of the body 17 and having a plurality of jet orifices 46 and 47 opening to the combustion space. The number, arrangement and sizes of the orifices 46 and 47 are subject to considerable selection, but in the present instance two orifices 46 and four orifices 47, all of the same size, are shown. Two nozzle passages 48 and 49 respectively are formed in the tips 44 and 45 and communicate with the orifices 46 and 47. The inner ends of the passages 48 and 49 open respectively past conical valve seats 50 and 51 to two fuel chambers 52 and 53 in the body 17. Valve members 54 and 55 are adapted to coact respectively with the seats 50 and 51 to control the supply of fuel to the orifices 46 and 47.

The valves 54 and 55 are adapted to be opened or lifted by fuel pressure in the chambers 52 and 53, and to this end are carried by pressure responsive members, such as reciprocable pistons or plungers 56 and 57. While within certain broad aspects of the invention, provision may be made for seating or closing the valves 54 and 55 under the influence of any desired relative pressures applied through any suitable medium, preferably the valves are operable fully hydraulically, and more specifically are seated by uniform fuel pressure acting on the outer ends of the plungers 56 and 57. In the present instance, the chamber 36 constitutes a pressure chamber to which fuel under pressure is supplied, and in which the outer ends of both plungers 56 and 57 are exposed.

Selective operation of the valves 54 and 55 is effected so that during injection first the primary nozzle 15 alone will inject fuel over an initial period and then both nozzles 15 and 16 will inject fuel over a final period. The successive opening of the valves 54 and 55 in a predetermined sequence is accomplished by subjecting the plungers 56 and 57 to unequal lifting pressure differentials. Where equal seating pressures are employed, as illustrated, such differentials are obtained by exerting unequal net lifting pressures on the plungers 56 and 57 in the fuel chambers 52 and 53.

Preferably, the valves 54 and 55 are arranged in parallel, so that the opening of one is not physically dependent on the opening of the other, and are subject to the same fuel pressure. Thus, the chambers 52 and 53 are joined by a common fuel inlet passage 58 so as in effect to constitute one fuel chamber, and the plungers 56 and 57 are reciprocable in parallel bores 59 and 60 formed in the body 17 and opening at opposite ends into the pressure and fuel chambers 36 and 52, 53. Since in the present instance both plungers 56 and 57 are subjected in common to one seating fuel pressure and to one lifting fuel pressure, the unequal lifting pressure differentials are obtained by making the ratio of the lifting pressure area, exposed in the fuel chambers 52, 53, to the seating pressure area, exposed in the pressure chamber 36, for the plunger 56 greater than that for the plunger 57 when the valves 54 and 55 are seated. The specific area ratios are determined by the design and dimensions of the plungers 56 and 57 and the embraced areas of the valve seats 50 and 51, and may be obtained in different ways by varying the relationship between the foregoing factors. In the form selected for illustration, the two plungers 56 and 57 are cylindrical and of uniform diameter throughout the length of the bores 59 and 60, and differ only slightly in diameter, and the valve seat 50 is substantially smaller than the valve seat 51.

It will be evident that when the valves 54 and 55 are open, the area ratios will be alike and equal to one, and when the valves are closed, the lifting pressure areas will be reduced in effect by the areas of the valve seats so that the area ratios will be unequal as described and less than one. Preferably, the effective cut-off areas of the valve seats 50 and 51 are twenty (20) and thirty (30) percent. of the associated end faces of the respective plungers 56 and 57 so that the latter have pressure area ratios of eighty (80) and seventy (70) percent. respectively when the valves 54 and 55 are seated.

To provide means for supplying fuel under pressure to the fuel chamber 52, 53, the ends of the fuel inlet passage 58 intersect the inner ends of two diametrically opposed longitudinal slots 61 formed in the exterior of the nozzle unit body 17. The outer ends of the slots 61 open to the interior of the casing 19 about the rod 37, constituting a supply chamber 62.

Connected to the casing 19 and opening through a port 63 therein to the chamber 62 is a fuel feed conduit 64. The connection preferably comprises a sleeve 65 which is snugly positioned on the outer end 28 of the casing 19 and against the plate 29, and which has a lateral boss 66 formed with an aperture 67 to receive the discharge end of the conduit 64. A clamp nut 68 is threaded into the aperture 67 against a collar 69 threaded onto the conduit 64 to secure the end of the latter tightly against the casing 19 in alinement with the port 63.

The conduit 64 is adapted to be connected to a suitable source of fuel, as hereinafter described, and is connected to all of the nozzle units 1 to 8. Thus, all of the feed chambers 52, 53 are constantly in intercommunication through the common conduit or feed rail 64.

Fuel under pressure is adapted to be supplied to the pressure chamber 36 through an axial passage or bore 70 formed in the rod 37. The outer end of the bore 70 opens through an alined axial bore 71 in the nut 40 to the space 72 between the nut and the plug 43. A control conduit 73 connected to the casing 19 in the same manner as the feed conduit 64 opens to the space 72. Similar control conduits 74 to 80 are provided respectively for the other nozzle units 2 to 8, and all of the conduits are adapted to be connected to a suitable source of fluid pressure, such as liquid fuel pressure, as hereinafter described.

The connection for the conduit 73 comprises a second aperture 81 in the boss 66, a collar 82 threaded onto the discharge end of the conduit, and a nut 83 threaded into the aperture against the collar to secure the conduit tightly against the casing 19 in alinement with a port 84 opening to the space 72.

Since the area ratios for the valve plungers 56 and 57 are less than one (1) when the valves 54 and 55 are closed, the valves will remain closed when equal fluid pressures are impressed in the pressure chamber 36 and the fuel chamber 52, 53, and will open only upon increasing the fuel lifting pressure relatively above the fluid seating pressure, whatever the latter may be and however it may be applied, to overcome the ratios. Opening of the valves 54 and 55 thus involves a reversal in direction of the pressure differential. In a broad sense, such reversal may be accomplished in various ways, as for example by sufficiently increasing the pressure in the fuel chamber 52, 53. Preferably, opening of the valves 54 and 55 is effected, subsequently to the establishment in the fuel chamber 52, 53 of the pressure, approximately equal to the normal pressure of the seating fluid, at which the fuel is to be injected into the cylinder, by gradually reducing the seating pressure. As a result, no building up of the fuel pressure in the chamber 52, 53, involving a time consuming flow and a fluctuation in the injection pressure, nor creation of pressure surges due to momentum, occur during opening of the valves. On the contrary, the full injection pressure is immediately available, thus avoiding dribbling and providing a quick and sensitive control.

Figure 19:
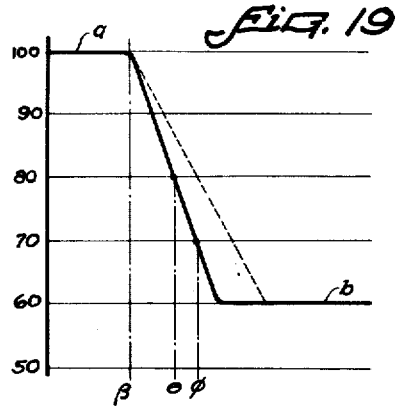
Fig. 19 is a time chart illustrating the timed relation of the opening of the respective nozzles for each cylinder to the crank shaft rotation.

Since their seating area ratios are unequal, the valves 54 and 55 will open in timed sequence upon reduction of the seating pressure. The relationship of the control pressure reduction to the sequential opening of the valves 54 and 55 is illustrated in the time chart shown in Fig. 19 wherein percentages of control pressure reduction are plotted along the ordinate, and time in degrees of crank shaft rotation is plotted along the abscissa. The rate of pressure reduction is represented by the curve $a$—$b$, assuming that 100 percent. represents the normal maximum seating fuel pressure in the chamber 36, and that the fuel pressure in the chamber 52, 53 is equal thereto during opening of the valves 54 and 55, the drop in pressure starts at $\beta$ degrees of crank shaft rotation. After a drop in pressure of twenty (20) percent., the seating area ratio of .8 will have been overcome, and hence the valve 54 will be opened at $\theta$ degrees of crank shaft rotation. A further drop of ten (10) percent. in the control pressure results in overcoming the seating area ratio of .7, and the consequent opening of the secondary valve 55 at $\phi$ degrees of crank shaft rotation.

Figure 20:
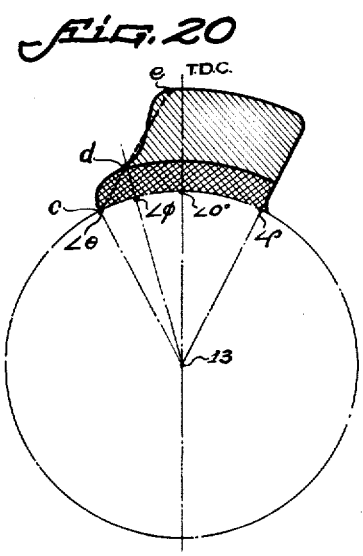
Fig. 20 is a polar diagram comprising curves illustrating the graduated rate of fuel injection and the rate of pressure variation for one axial and phase setting of the distributor.

The multiple rate of fuel injection is illustrated diagrammatically in the polar diagram of Fig. 20, in which the degrees of crank shaft rotation are indicated angularly, and the rate of injection is plotted along the radians. Upon opening of the valve 54 at $\theta$ degrees, i. e., 360°–$\theta$° before top dead center, fuel is injected through the primary nozzle 15 at a rate $c$—$d$, depending on the injection pressure and the characteristics of the valve 54 and the nozzle orifices 46. Subsequent opening of the valve 55 at $\phi$ degrees, i. e., 360.–$\phi$° before top dead center, causes fuel to be injected also through the secondary nozzle 16 at a rate $d$—$e$, subject to the same factors as the rate $c$—$d$, thus injecting fuel at the combined rate $c$—$e$. Upon restoring the normal seating pressure in the chamber 36, and reducing the fuel pressure in the chamber 52, 53, as through venting or injection after cut-off, the valves 54 and 55 are both quickly closed at ρ degrees after top dead center. The amount of fuel injected is represented by the cross-hatched area, the double cross-hatched portion pertaining to the primary nozzle 15 and the single cross-hatched portion relating to the secondary nozzle 16.

Thus, the rate of injection, particularly at the start, is graduated in steps c—d and d—e, represented approximately by a mean curve c—e, hereinafter referred to as "rate curve". Obviously, the greater the number of nozzles that are provided, the more closely do the series of incremental steps approach to the rate curve.

The rate curve of injection is subject to adjustment so as to approximate a theoretical ideal, i. e., to admit fuel into the engine cylinder 9 at the most advantageous rate at any moment during the entire period of injection. Such adjustment can be accomplished by a judicious variation in the rate of seating pressure drop and/or rise, and/or selection of different seating area ratios for the valves 54 and 55, and/or selection of nozzles having different coefficients of flow, and/or regulation of the relative extent of rise of the valves. Preferably, the valves 54 and 55 are opened in sequence and closed substantially simultaneously, although they may also be closed in sequence. Ordinarily, the restriction to flow in the control conduits 73 to 80, when being exhausted to a lower pressure, is such that a suitable timed pressure drop to produce the desired rate curve is obtained. Varying the rate curve by changing the rate of control pressure drop may be effected by adjusting the restriction to flow in the control tubes 73 to 80 selectively in either or both directions.

The multiple nozzle means herein disclosed (see Figs. 2 to 7) forms the subject matter of my divisional application Serial No. 131,771, filed March 19, 1937.

*Pressure control means*

It will be noted that the present system is of the hydraulic impulse type. As described, the injection of fuel into the engine cylinder 9 is determined in part by the shape of the rate curve which is subject to adjustment, and which is responsive to the character of the hydraulic impulses. The injection of fuel is also controlled by regulating the relative and individual timing of the hydraulic impulses for the purpose of determining (1) the phase relation of the injection period to the crank shaft rotation, i. e., the initial point of fuel introduction, (2) the duration of the injection period, and (3) the number of valves that may be operated during the injection period. Preferably, a fluid pressure distributor of the rotary type indicated generally at 85 is employed.

The distributor 85 in its preferred form (see Figs. 8 to 15) comprises a cylindrical casing 86 which is closed at one end by a removable screw plug 87, and which is mounted at the other end on a housing 88 adapted to be rigidly secured on the engine. A rotor 89 is slidably and rotatably mounted in the casing 86, and has an extension shaft 90 projecting therefrom through the housing 88 for operative connection to the engine crank shaft 13. In the present instance, the drive connection comprises a spiral gear 91 axially splined to the shaft 90 and meshing with a second spiral gear 92 on an idler shaft 93. The gear 92 meshes with a spiral gear 94 rigid with the shaft 13. The gear ratio is such that the rotor 89 is driven at the necessary speed relative to the crank shaft 13, i. e., one-half the crank shaft speed for conventional four stroke cycle engines or at the crank shaft speed for conventional two stroke cycle engines.

The angular phase relation between the rotor 89 and the crank shaft 13 is subject to adjustment through shifting of the gear 91 relative to the gear 92 longitudinally of the shaft 90. A hand actuator 95 is operatively connected to the gear 91, and thus affords manual means for effecting the desired phase setting at will.

Any suitable means, such as an automatic governor (not shown) or a manual throttle actuator 96, may be provided for adjusting the rotor 89 axially. In the present instance, the actuator 96 is operatively connected to a gear sector 97 pivoted on the housing 88 and meshing therein with a sleeve rack 98 rotatably mounted on the shaft 90 for axial movement therewith.

Opening in spaced relation to the interior of the casing 86, and interconnected by a longitudinal passage 99 formed therein, are three substantially alined high pressure fuel inlet ports 100, 101 and 102. A high pressure fuel line or conduit 103 is connected to the casing 86 in the transverse plane (see Fig. 12) of the intermediate port 101, and is in communication therewith and with the passage 99.

The common branched fuel feed conduit 64, leading to the nozzle units 1 to 8, is connected at its inlet end to the casing 86, and communicates with the interior thereof through a port 104. The ports 100 and 104 are located in transverse planes (see Figs. 10 and 11) closely spaced longitudinally of the casing 86. Formed in the exterior of the rotor 89 are eight uniformly peripherally spaced and narrow elongated feed slots 105 to 112, one slot for each nozzle unit. The slots are parallel to the rotor axis; extend longitudinally through the transverse plane of the feed port 104 for all positions of axial adjustment of the rotor 89; are adapted to extend through the transverse plane of the port 100 for the purpose of periodically connecting the two ports to charge the feed conduit 64; and are connected respectively through radial passages 113 to an axial chamber 114 formed in the free end of the rotor 89, and hence constantly in intercommunication.

Preferably, the ports 100 and 104 are spaced peripherally of the casing 86, so that the periodic connection of the feed conduit 64 with the high pressure conduit 103 is established through successive sets of two of the slots, the associated passages 113 and the chamber 114.

Formed in the exterior of the rotor 89 is an uninterrupted peripheral high pressure belt defined by a groove 115 (see Figs. 8 and 12) in constant communication with the intermediate port 101 for all positions of axial adjustment. A cutoff land 116 extends longitudinally of the rotor 89 into one end and almost across the high pressure belt 115. Formed in the side of the rotor 89 and extending longitudinally thereof is a narrow elongated low pressure slot 117. One end of the slot 117 extends centrally into the land 116.

The eight control conduits 72 to 80 are suitably connected to the casing 86, and open respectively through eight uniformly peripherally spaced control ports 118 to 125 in a single transverse plane (see Fig. 13) to the interior thereof in registration longitudinally of the rotor with the high pressure belt 115 and the slot 117 for all positions of axial adjustment of the rotor.

Thus, the slot 117 is moved successively across the ports 118 to 125 in timed relation to the charging of the common feed conduit 64 to effect the timed sequential pressure reductions in the control conduits 73 to 80. The land at each side of the slot 117 is sufficient in width to prevent the control ports from connecting it to the high pressure belt 115.

The low pressure slot 117 is an extension of one of eight uniformly peripherally spaced and narrow elongated slots 126 to 133 formed in the exterior of the rotor 89 in a single transverse plane (see Figs. 8 and 14), and constantly in intercommunication through intersecting radial connecting passages 134. Connected to the casing 86 and opening thereto through a port 135 in the same plane as the high pressure port 102 (see Fig. 14) is a low pressure fluid conduit 136. The two ports are adapted to communicate alternately and successively with the slots 126 to 133 in all axial positions of the rotor 89 so that each time the port 135 is over one of the slots 126 to 133, the slot 117 will be connected to the low pressure conduit 136, and at alternate times the slot 117 is connected to the high pressure conduit 103.

To vary the duration of pressure reduction in the control conduits 73 to 80, and hence the period of injection, the slots 126 to 132 are inclined to the rotor axis so that axial shifting of the rotor 89 is effective to adjust the phase relation of the period of communication of the slots with the low pressure port 135 to the period of communication of the slot 117 with each of the control ports 118 to 125.

The operation is illustrated in Figs. 17 and 18. In Fig. 17, with the rotor 89 adjusted for full throttle opening and rotated into position about to effect operation of the multiple nozzle 1, the high pressure port 100 has left the feed slot 112, and the feed port 104 has left the slot 106, so that the common feed conduit 64 has been charged and cut off preparatory for injection. The maximum fuel pressure is thus impressed in the feed chamber 52, 53, but the valves 54 and 55 because of their differential seating area ratios remain closed.

The control port 118 has left the high pressure belt 115 and is about to communicate with the low pressure slot 117 preparatory for a reduction of the seating pressure in the control conduit 73 and the chamber 36. Since the rotor 89 is adjusted for maximum throttle opening, the slot 117 is connected to the low pressure substantially concurrently with communication with the port 118 so as to effect a seating pressure reduction of maximum duration for maximum injection. Thus, just as the port 118 is about to communicate with the slot 117, the low pressure port 135 is about to communicate with the slot 126 and the high pressure port 102 is about to leave the slot 129.

Reduction of the seating pressure causes the valves 54 and 55 to open in predetermined sequence. Upon further rotation of the rotor 89, the port 135 will leave the slot 126 to interrupt the low pressure connection, and the high pressure port 102 will come into communication with the slot 128 to charge the slot 117 with high pressure so as to restore the seating pressure in the chamber 36, thereby closing the valves 54 and 55.

In Fig. 18, with the rotor 89 adjusted for idling throttle operation, and occupying the same rotary position as in Fig. 17, the angular phase relation of the ports 100, 104 and 118 to the slots 111, 105 and 117 is unaltered. However, the slot 117 upon communication with the port 113 has already been connected for a substantial time to the low pressure, and hence the pressure port 135 will in a short time leave the slot 126 so that the period of pressure reduction is of short duration. Thus, the period of pressure reduction is adjusted by varying the degree to which the communication of the slot 117 with the control port 118 overlaps the period of connection of the slot with the low pressure port 135. In the variation of the duration of pressure reduction, the starting point of pressure reduction is fixed while the cut-off is variable. It will be evident that if the rotor 89 is adjusted axially into a position wherein the port 135 will have moved out of communication with the low pressure source before the port 118 is brought into communication with the slot 117, a closed throttle condition will exist and neither the primary valve nor secondary valve will open. It will be understood that at certain small throttle openings, the period of control pressure reduction may be so short that only the primary nozzle 15 will inject.

Provision is made for reducing the maximum charging pressure in the feed conduit 64 for idling operation, so as to insure quick and positive seating of the nozzle valves and accurate metering of the small amounts of fuel injected. To this end, the feed slots 105 to 112 are movable out of the range of the high pressure port 100 upon axial adjustment of the rotor 89 for small throttle openings (see Fig. 18) so as to prevent charging of the feed port 104 directly from the high pressure source, and means is provided for charging the feed port indirectly from the source past a pressure reducing valve 137 (see Figs. 15, 17 and 18).

In the preferred form, the valve 137 is interposed between the chamber 114 and the high pressure belt 115. The chamber 114 opens past a valve seat 138 to a reduced axial bore extension 139 communicating through a passage 140 with the pressure belt 115. A valve member 141 having a longitudinally fluted guide stem 142 slidably disposed in the bore 139 is normally urged against the seat 138 by a coiled compression spring 143 in the chamber 114. The spring 143 is seated against an adjusting screw plug 144 threaded into the chamber 114. The outer end of the chamber 114 is suitably closed by a removable screw plug 145. It will be evident that the pressure reduction effected by the valve 137 on the fuel in passing from the belt 115 to the chamber 114 is subject to adjustment by adjusting the pressure of the spring 143.

The distributor 85 is constructed to prevent fuel oil from leaking past the ends of the rotor 89 out of the casing 86, and to lubricate and balance the rotor so as to insure ease of rotation. Thus, two spaced annular labyrinth grooves 146 and 147 are formed in each end of the casing 86 about the rotor 89. The inner grooves 146 and the outer grooves 147 are connected respectively by longitudinal passages 148 and 149 formed in the wall of the casing 86 (see Fig. 15). A drain conduit 150 is connected to the casing 86 in communication with the passage 148. It will be evident that fluid or fuel under pressure tending to leak outwardly along the rotor 89 will be caught by the grooves 146 and withdrawn through the conduit 150. A viscous fluid under pressure, such for example as lubricating oil from the engine, is supplied to the outer grooves 147 through a conduit 151 connected to the casing 86 in communication with the passage 149, and tends to leak inwardly along the rotor 89 to the grooves 146 so as to insure the prevention of leakage of fuel outwardly past the grooves 146, and to lubricate and balance the rotor.

The fluid distributor herein disclosed (see Figs. 8 to 15) forms the subject matter of my divisional application Serial No. 179,070, filed December 10, 1937.

Charge limiting

Within the broad aspects of the invention, the feed conduit 64 may be connected to the high pressure fuel source while each set of valves is open. Preferably, however, the conduit 64 is charged with fuel at full pressure, and then cut off or sealed before each pressure reduction in the respective control conduits 73 to 80. The trapped fuel is stored until the next nozzle unit in the order of sequence is operated whereupon the fuel is injected under its own pressure. It will be evident that in this manner the charge of fuel that can be injected in any one period is definitely limited. Hence, an excessive overcharge cannot occur even though the engine speed is greatly reduced.

To increase the pressure capacity of the feed conduit 64 so as to cause the injection of fuel normally to occur under a substantially constant pressure, a storage reservoir 152 is interposed in the conduit. Preferably, the reservoir 152 consists of a bottle or bulb having a yieldable wall. The inherent resiliency of the walls of the conduit 64 and the reservoir 152 serves to maintain the fuel pressure over a substantial period during injection. The conduit 64 with the reservoir thus constitutes a fuel pressure storage and charge limiting means.

Pressure sources

The high pressure conduit 103 may be connected to any suitable source of fuel under pressure. In the present instance, the conduit 103 constitutes the discharge line of a constant pressure fuel pump 153.

The low pressure conduit 136 may be connected to any suitable source of fluid under pressure. Preferably, the pressure in the conduit 136 is maintained substantially constant at a value just low enough to insure opening of the injection valves. Thus, in the present instance, where the seating pressure in the control conduit must suffer a twenty percent. reduction to effect opening of the primary nozzle 15 and a thirty percent. reduction to cause opening of the secondary nozzle 16, the pressure in the conduit 136 should be somewhat less than seventy (70) percent. of the full seating pressure, say for example sixty (60) percent. In maintaining the relative pressure in the conduit 136 as high as possible, the range of pressure fluctuations in the control conduits 73 to 80 is kept to a minimum so that an excess of fuel is not bled from the system in reducing the control pressure, and that the full pressure can be quickly restored. Thus, the nozzle valves are subject to a sensitive control, and can be operated at a high speed consistent with present day maximum engine speed requirements.

The conduit 136 preferably is connected to the fuel source, namely the pump 153, as for example through a subdivided valve 154 and a conduit 155 branching from the high pressure conduit 103.

The valve 154 may be of any suitable form adapted to maintain a subdivided fuel pressure in the conduit 136 of a substantially constant ratio to the fuel pressure from the source, i. e., the pressure in the conduit 103. In its preferred form, the subdivider valve 154 (see Fig. 16) comprises a casing 156 formed with a differential bore 157, of which the large end is connected to the conduit 136 and the small end is connected to the branch conduit 155. The differential area of the bore 157 is equal in percentage to the pressure reduction that is to be effected in the control conduits 73 to 80. Slidably disposed in the bore 157 is a differential piston 158 divided into two sections of different diameters.

The small section of the bore 157 is formed with an annular port 159 which is connected through a by-pass passage 160 to the outer end of the large section of the bore, and which is adapted to be uncovered by the outer end of the small section of the piston 158 upon a reduction of the pressure in the conduit 136 below the predetermined point determined by the differential area so as to permit make-up fuel to pass from the conduit 155 to the conduit 136. The large section of the bore 157 is formed with an annular port 161 opening to a drain passage 162 preferably connected to the source of fuel supply. A peripheral groove 163 is formed in the large section of the piston 158, and is connected through an axial passage 164 to the large end of the bore 157. Upon an increase in pressure in the conduit 136 above the predetermined pressure, the groove 163 will be moved into communication with the port 161 to bleed the excess fuel to the drain passage 162. Thus, a pressure bearing a substantial ratio to the pressure in the conduit 103 is maintained in the conduit 136.

Résumé of operation

Assuming that the nozzle units 1 to 8 have the desired rate curve of injection, and that the gear 91 has been adjusted axially to obtain the desired phase relation of the injection periods to the cyclic movements of the pistons, the rotor 89 is driven in timed relation to the crank shaft 13 to periodically charge the common feed conduit 64 and the accumulator 152 at the full fuel pressure, and once for each fuel charge to reduce for a definite variable period and then restore the seating pressure successively in the respective control conduits 73 to 80, thus causing sequential operation of the nozzle units. The period of pressure reduction and hence the duration of injection are subject to adjustment, in accordance with the engine requirements, by shifting the rotor 89 axially. At low loads, the feed conduit 64 is charged at a pressure less than full pressure to insure quick and accurate closing of the nozzle valves 54 and 55. Preferably, the feed conduit 64 is cut off from the fuel source during injection so that the maximum possible volume of fuel injected in a single charge is limited by the pressure and capacity characteristics of the feed conduit and the storage reservoir 152.

The extent and rate of combustion pressure rise are limited and controlled to avoid combustion knock and excessive peak pressures, and the attendant faults such as noise, shock and fatigue and failure of the engine parts. Thus, the start of injection is delayed until the compression temperature is most propitious for ignition with a minimum of ignition lag. If fuel is injected too far in advance of top dead center, even though the rate be decreased, the temperature and presure in the combustion space will not have risen sufficiently to insure prompt ignition, and hence there will be a substantial ignition lag resulting in the accumulation of unburned fuel and upon ultimate ignition in an objectionable knock. The shape of the curve rate of injection should be such that at the start only a small amount of fuel is injected so that a minimum of heat is required to effect ignition. Thus, the initial fuel instead of cooling the air in the compression space of the engine cylinder and thereby retarding ignition, burns quickly, thus increasing the combustion temperature and preparing the combustion space for the ignition of the main part of the charge practically at the rate at which it is introduced. The first fuel to be injected, being under the full injection pressure is atomized at least as finely as the main portion of the charge. By reason of the foregoing control, the degree of pressure rise, depending on the amount of fuel burned before top dead center, and the rate of pressure rise, governed by the amount of fuel introduced before ignition are so regulated that the engine operates smoothly, noiselessly and efficiently.

I claim as my invention:

1. In a fuel injection system, in combination, an injection nozzle, a fuel feed conduit connected to said nozzle, a direct source of fuel under a relatively high pressure, a secondary source branching from said direct source and including pressure reducing means for maintaining a relatively low pressure, and means selectively adjustable into position to connect either of said sources periodically to said conduit.

2. In a fuel injection system, in combination, a plurality of injection nozzles each having a pressure responsive valve actuator, a single fuel feed conduit connected in common to said nozzles at one side of said actuators, said conduit having a pressure-storage charge-limiting reservoir, a plurality of control conduits connected to said nozzles at the other side of said actuators, and means for periodically charging and sealing said feed conduit and for successively effecting pressure fluctuations in said control conduits to cause said actuators to lift in sequence so as to release fuel from said feed conduit.

3. In a fuel feeding system for a multiple cylinder internal combustion engine, in combination, a plurality of fluid pressure operable fuel injection valves, one for each engine cylinder, each injection valve having a reciprocable valve member with lifting and seating areas at opposite ends thereof, a plurality of control lines, one for each injection valve, having control ports at one end and opening to said seating areas of the respective injection valves at the other end, a common feed line in constant open communication with the lifting areas of each of said injection valves and having a single control port, a pressure-storage charge-limiting reservoir in said feed line, a source of fluid under relatively high pressure, a source of fluid under relatively low pressure and means for periodically connecting said single control port with said source of high pressure for predetermined period to charge said common feed line and then alternately connect a control port of a selected control line in a predetermined order to said source of relatively low pressure to vent the pressure from the seating area of the associated injection valve, whereby said valves are opened and closed for a predetermined time and in a predetermined order.

CARROLL R. ALDEN.

CERTIFICATE OF CORRECTION.

Patent No. 2,145,640. January 31, 1939.

CARROLL R. ALDEN.

It is hereby certified that error appears in the printed specification of the above numbered patent requiring correction as follows: Page 3, first column, line 2, for the word "chambers" read chamber; and second column, line 67, for "360." read 360°; page 4, second column, line 68, for the numeral "72" read 73, page 5, first column, line 29, for "132" read 133; and that the said Letters Patent should be read with this correction therein that the same may conform to the record of the case in the Patent Office.

Signed and sealed this 21st day of March, A. D. 1939.

Henry Van Arsdale.

Acting Commissioner of Patents.

(Seal)

ure in the combustion space will not have risen sufficiently to insure prompt ignition, and hence there will be a substantial ignition lag resulting in the accumulation of unburned fuel and upon ultimate ignition in an objectionable knock. The shape of the curve rate of injection should be such that at the start only a small amount of fuel is injected so that a minimum of heat is required to effect ignition. Thus, the initial fuel instead of cooling the air in the compression space of the engine cylinder and thereby retarding ignition, burns quickly, thus increasing the combustion temperature and preparing the combustion space for the ignition of the main part of the charge practically at the rate at which it is introduced. The first fuel to be injected, being under the full injection pressure is atomized at least as finely as the main portion of the charge. By reason of the foregoing control, the degree of pressure rise, depending on the amount of fuel burned before top dead center, and the rate of pressure rise, governed by the amount of fuel introduced before ignition are so regulated that the engine operates smoothly, noiselessly and efficiently.

I claim as my invention:

1. In a fuel injection system, in combination, an injection nozzle, a fuel feed conduit connected to said nozzle, a direct source of fuel under a relatively high pressure, a secondary source branching from said direct source and including pressure reducing means for maintaining a relatively low pressure, and means selectively adjustable into position to connect either of said sources periodically to said conduit.

2. In a fuel injection system, in combination, a plurality of injection nozzles each having a pressure responsive valve actuator, a single fuel feed conduit connected in common to said nozzles at one side of said actuators, said conduit having a pressure-storage charge-limiting reservoir, a plurality of control conduits connected to said nozzles at the other side of said actuators, and means for periodically charging and sealing said feed conduit and for successively effecting pressure fluctuations in said control conduits to cause said actuators to lift in sequence so as to release fuel from said feed conduit.

3. In a fuel feeding system for a multiple cylinder internal combustion engine, in combination, a plurality of fluid pressure operable fuel injection valves, one for each engine cylinder, each injection valve having a reciprocable valve member with lifting and seating areas at opposite ends thereof, a plurality of control lines, one for each injection valve, having control ports at one end and opening to said seating areas of the respective injection valves at the other end, a common feed line in constant open communication with the lifting areas of each of said injection valves and having a single control port, a pressure-storage charge-limiting reservoir in said feed line, a source of fluid under relatively high pressure, a source of fluid under relatively low pressure and means for periodically connecting said single control port with said source of high pressure for predetermined period to charge said common feed line and then alternately connect a control port of a selected control line in a predetermined order to said source of relatively low pressure to vent the pressure from the seating area of the associated injection valve, whereby said valves are opened and closed for a predetermined time and in a predetermined order.

CARROLL R. ALDEN.

CERTIFICATE OF CORRECTION.

Patent No. 2,145,640. January 31, 1939.

CARROLL R. ALDEN.

It is hereby certified that error appears in the printed specification of the above numbered patent requiring correction as follows: Page 3, first column, line 2, for the word "chambers" read chamber; and second column, line 67, for "360." read 360°; page 4, second column, line 68, for the numeral "72" read 73, page 5, first column, line 29, for "132" read 133; and that the said Letters Patent should be read with this correction therein that the same may conform to the record of the case in the Patent Office.

Signed and sealed this 21st day of March, A. D. 1939.

Henry Van Arsdale.

Acting Commissioner of Patents.

(Seal)